Nov. 24, 1970 E. G. THURSTON 3,542,947

VIDEO DISPLAY OF LINE SEQUENTIAL COLOR SIGNAL

Filed Jan. 19, 1968 3 Sheets-Sheet 1

Inventor:
Edward G. Thurston.

By Griffin and Branigan
Attys

VIDEO DISPLAY OF LINE SEQUENTIAL COLOR SIGNAL

Filed Jan. 19, 1968 3 Sheets-Sheet 2

Inventor:
Edward G. Thurston.

By Griffin and Branigan
Attys

Inventor:
Edward G. Thurston

By Griffin and Branigan
Attys

United States Patent Office 3,542,947
Patented Nov. 24, 1970

3,542,947

VIDEO DISPLAY OF LINE SEQUENTIAL COLOR SIGNAL

Edward G. Thurston, Chicago, Ill., assignor to Bell & Howell Company, Chicago, Ill., a corporation of Illinois Filed Jan. 19, 1968, Ser. No. 699,085
Int. Cl. H04n 9/34; H03d 7/00
U.S. Cl. 178—5.4 5 Claims

ABSTRACT OF THE DISCLOSURE

This disclosure describes a novel method and apparatus for simultaneously displaying video color signals received in line sequential form. The method is a variation of the "mixed highs" method used in color signal transmission. The color signals R, G and B are received one horizontal line at a time in sequence. Each color signal is filtered to separate the highs from the lows. The highs are applied immediately to the cathodes of a three-gun color display tube. The lows are applied to the grids of the display tube with the lows of each color signal being applied to the same grid on each of at least two successive horizontal line scan intervals. This is accomplished by immediately applying the lows of an incoming signal to a grid, delaying the lows for at least one horizontal line scan interval and again applying them to the grid. With one delay two colors are available, and with two delays three colors are available for display during each horizontal line scan interval even though only one new line of color information is received during the interval.

A novel apparatus facilitates the practice of the invention. The apparatus includes an adder, delay line, filter, and oscillator/modulator connected in a closed loop. As each incoming color signal is applied to the display tube, the lows are fed into the adder and then delayed by one horizontal line scan interval before being applied to the filter. The filter passes the lows and the output of the filter is applied to the display tube. The output of the filter modulates the oscillator output and the output of the modulator is applied to the delay line. A band pass filter is connected to the output of the delay line and passes only the modulated signal. The signal is demodulated and the resulting signal applied to the display tube.

A modulo-three counter is advanced by one for each horizontal scan and the output of the counter controls three sets of gates for selectively gating the lows to the grids of the display tube.

BACKGROUND OF THE INVENTION

Until recently, the only acceptable way of recording and replaying color television signals has been to record the whole composite signal on highly accurate video tape recorders and then process the composite signal upon playback in the same manner as a signal received from a remote broadcast station. Even very minor imperfections and phase changes introduced by the recorder resulted in unacceptable degradation of the color picture. Furthermore, these systems were extremely expensive and required either a rotating read/record head or an extremely high video tape speed.

Copending application Ser. No. 538,815, now Pat. No. 3,440,341 (assigned to the same assignee as the present application) discloses a system which permits the recording and subsequent display of color video signals by using a linear or fixed head recorder having a tape speed the same as for monochrome recording. Likewise, the system is applicable to rotating head VTR's, the bandwidth capacity and other limitations of which renders it normally suitable for use only with monochrome material. In this system the color difference signals $R-Y$, $G-Y$ and $B-Y$ are added to the luminance signal Y externally of the display tube to stimultaneously produce the color signals R, G and B. During each horizontal scan interval one of the colors is sampled and recorded thus producing line sequential color signals on the tape. On playback, each line sequential color signal is applied to the display device, delayed for one horizontal scan interval, and again applied to the display device so that two colors are displayed during each horizontal scan interval. While the system is satisfactory for most purposes, it suffers one moderate disadvantage. The absence of one color in each line gives rise to a fine horizontal line structure and reduces the overall brightness of the display.

Theoretically, this disadvantage could be overcome by a logical extension of the basic concept of the aforementioned application. That is, by providing an additional delay line each color signal might be delayed a second time and displayed a third time so that all three colors would be displayed during each line scan. However, in such a system each delay line must be capable of accurately delaying and reproducing video signals varying in frequency from 0 to 2 or more megacycles, the upper limit being determined by the capabilities of the video tape recorder which feeds the signals to the system. Such delay lines are exceedingly expensive, hence it is desirable to reduce the number of delay lines required and also reduce the bandwidth requirements of the delay lines.

The present invention reduces the bandwidth requirements of the delay lines by employing a display method similar to the "mixed highs" method of color signal transmission. It is well known in the mixed-highs concept that the luminance signal Y is a broad band signal ranging from 0 to approximately 4 megacycles whereas the color difference signals $R-Y$. $G-Y$, and $B-Y$ are narrow band signals ranging from 0 to .5 megacycle. When the luminance signal Y is added to each of the color difference signals, the color signals R, G and B are obtained and these signals differ from each other only for the first half megacycle but have a common frequency distribution above the first half megacycle. Thus, large and medium areas of picture material are displayed in colors (0 to .5 mc.) whereas finer details are displayed in shades of gray by varying R, G and B in unison and in proper proportion.

BRIEF DESCRIPTION OF THE INVENTION

An object of the present invention is to provide a novel method of displaying line sequential color video signals.

Another object of this invention is to provide a novel method of displaying color video sgnals which are available in line sequential form, one color during each line scan interval of a display device, said method comprising the steps of separating the high freqencies of each color signal from the low frequencies thereof, adding said high frequencies and said low frequencies for display during the line scan interval they are received, delaying said low frequencies for one line scan interval and adding them to the high frequencies of the next color signal for display during the interval said next color signal is received.

Another object of this invention is to provide a novel display method as stated above and further comprising the steps of delaying said low frequencies for a further line scan interval and adding them to the high frequencies of a further color signal for display during the interval said further color signal is received.

A further object of the invention is to provide a novel method of delaying a signal for a first predetermined interval of time or a second predetermined interval of time.

A feature of the invention is the provision of novel apparatus for carrying out the objects stated above. In a preferred embodiment, line sequential color signals and accompanying synchronizing signals are made available at the input to the apparatus. The apparatus includes a conventional video display device and conventional sync and deflection circuits for controlling the scanning of the display device. Each incoming color signal is applied to a high pass and a complementary low pass filter. The output from the high pass filter is immediately applied to one set of electrodes of the display device. The output of the low pass filter is applied to a gating means and to a delay means. The delay means delays each signal for the equivalent of one horizontal line scan interval of the display device and applies it to the gating means. The delay means also delays each signal for the equivalent of two horizontal line scan intervals and applies it to the gating means. The display device has a second set of three electrodes and each of these electrodes is connected to outputs from the gating means. A sequencing means controlled by the incoming sync signals selectively controls the gating means so that the lows of a particular incoming color signal are applied to the same control electrode during three consecutive line scan intervals.

The delay means includes an adder, delay line, low pass filter and modulator connected in a closed loop. The delay line delays a signal applied thereto for a period of time equal to one line scan interval of the display device. Each signal passing through the delay line is filtered by the low pass filter and applied to the gating means and the modulator. The modulator modulates the output of an oscillator with the filtered output from the delay line, and the modulated signal is fed back to the delay line through the adder. The delay means also includes a band pass filter and a demodulator for recovering the original signal. The output of the demodulator represents the lower frequencies of the incoming color signal delayed in time by the equivalent of two line scan intervals.

DESCRIPTION OF FIGS. 1 AND 2

Figures 2, 5:
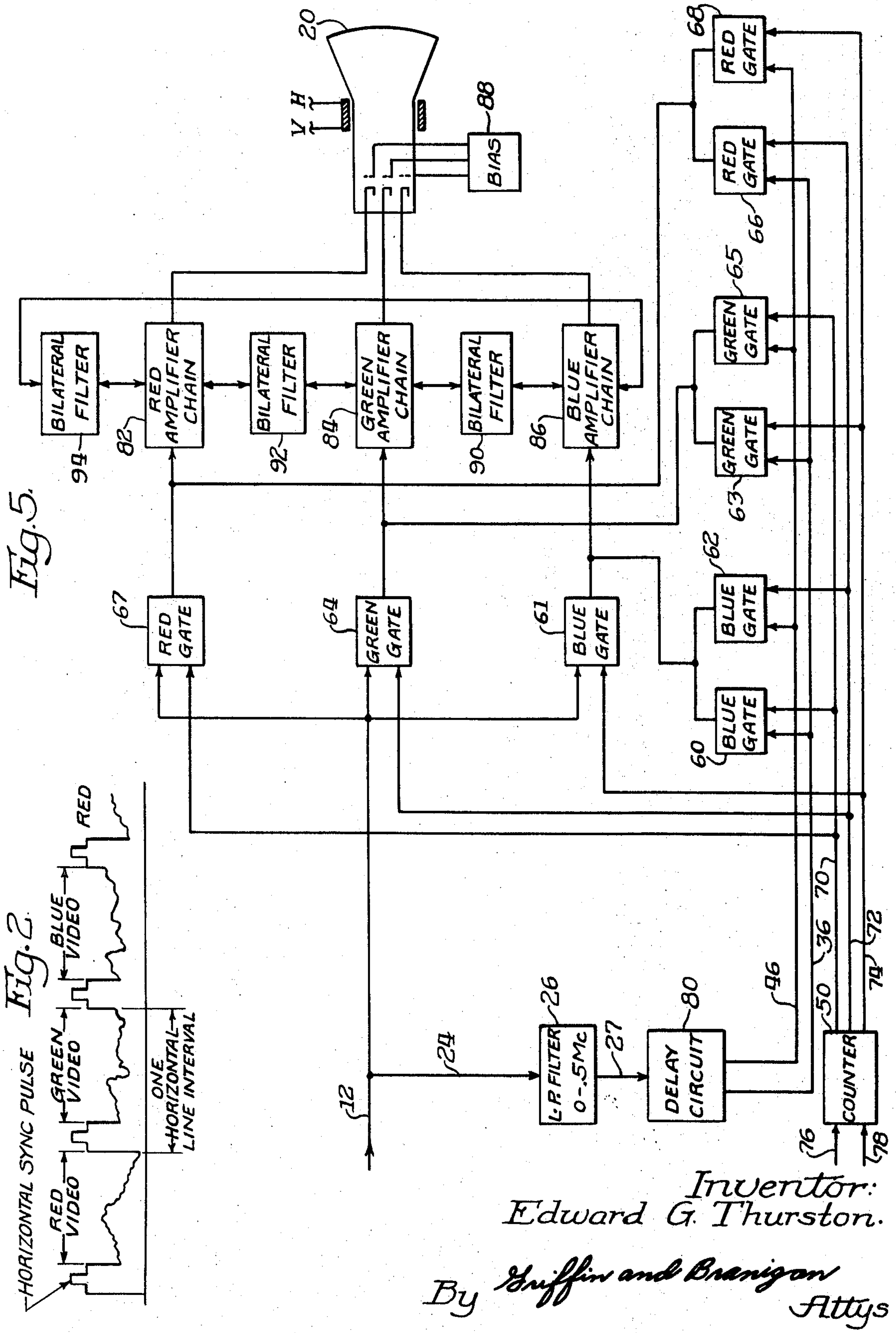
FIG. 2 is a waveform diagram illustrating the sequence of incoming color video and sync signals.
FIG. 5 is a block diagram of an alternative apparatus suitable for carrying out the novel method of displaying line sequential color video signals.

The format of line sequential color video signals is illustrated in FIG. 2. A line of red color information (R) is followed by a line of green color information (G) and this is followed in turn by a line of blue color information (B) after which the sequence R, G, B is repeated until the end of a field is reached. As is conventional in the art, the term "line of color information" means the color information which is displayed during one horizontal line scan interval of a cathode ray tube. A horizontal sync pulse precedes each line of color information. Although not shown in FIG. 2, it will be understood that the conventional vertical sync and blanking signals occur between the last line of color information of one field and the first line of color information of the next field. The line sequential signals may be derived as explained in copending application S.N. 538,815.

Upon playback, the recorder 10 (FIG. 1) reproduces the line sequential signals on an input lead 12 from whence they are applied to a high pass filter 14 and sync circuits 16. The sync circuits 16 control deflection control circuits 18 which produce the horizontal and vertical deflection signals for deflecting the cathode ray beams in a three-gun color display tube 20. The sync circuits 16, deflection controls 18, and display tube 20 may be of a type normally used in the United States for the reception and display of NTSC color signals.

The high pass filter 14 passes the "highs" or fine picture detail portion of the incoming signal on lead 12 but filters out the "lows" or color information contained on the incoming signal. The highs are amplified by a video amplifier 22 and applied to the cathodes of all three guns in the display tube 20.

Filter 14 is shown as having an upper band limit of 2.0 mc., but this may be varied as desired to match the capabilities of the video tape recorder 10.

The incoming signal on lead 12 is applied by way of a lead 24 and a low pass filter 26 to one input of an adder 28. The filter 26 filters out the highs but passes the lows or color information to the adder and to a lead 30. Thus, each line of color information appearing on lead 12 appears on lead 30 without delay.

The output of adder 28 is connected to a delay line 32 and the output of the delay line is connected to a low pass filter 34. The delay line is chosen such that it delays a signal applied to its input for an interval of time equal to one horizontal line scan interval of display tube 20. Thus, the low frequency portion of information appearing on lead 12 during a given line scan interval appears on lead 36 at the output of filter 34 during the next succeeding line scan interval.

The output of filter 34 is connected to a 2.5 mc., oscillator and modulator unit 38. The output of the oscillator is modulated by the output of filter 34 and the modulated signal is applied by way of lead 40 to a second input of adder 28.

The adder 28 adds the output of the oscillator and modulator unit 38 to the output from filter 26 and applies the combined signal to delay line 32. Upon exiting from the delay line the combined signal is again separated. This is accomplished by the low pass filter 34 which passes the unmodulated portion of the combined signal, i.e. the lows applied to the adder from filter 36, and a band pass filter 42. The band pass filter is connected to the output of the delay line and is chosen such that it passes only the modulated signal applied to it from the oscillator and modulator unit 38 by way of adder 28 and delay line 32.

A demodulator 44 is connected to the output of the band pass filter and recovers the 0 to .5 mc. lows which were originally applied to the oscillator and modulator unit 38 from the output of filter 34. Thus, the signals appearing on output lead 46 represent the lows of the total signal applied to lead 12 from the recorder but the signals appearing on lead 46 are delayed by two line scan intervals with respect to the time they were applied to lead 12.

From the above description it is evident that a particular low frequency color portion of the signal, appearing on lead 12, say red, during one line scan interval will appear on lead 30 during the same line scan interval, on lead 36 during the next succeeding line scan interval, and on lead 46 during the following line scan interval. Assuming that the color signals are applied to lead 12 in the sequence R, G, B, it is evident that each red signal appearing on lead 30, 36, or 46 is followed during the next line scan interval by a green signal on the same lead; and each green signal is, in turn, followed by a blue signal during the next line scan interval. Since the red color signals must always be applied to the red gun of the display tube 20 and the green and blue signals must be applied to the green and blue guns, respectively, a switching means must be provided to selectively route the signals on the leads 30, 36, and 46 to the three guns of the display tube.

Figure 1:
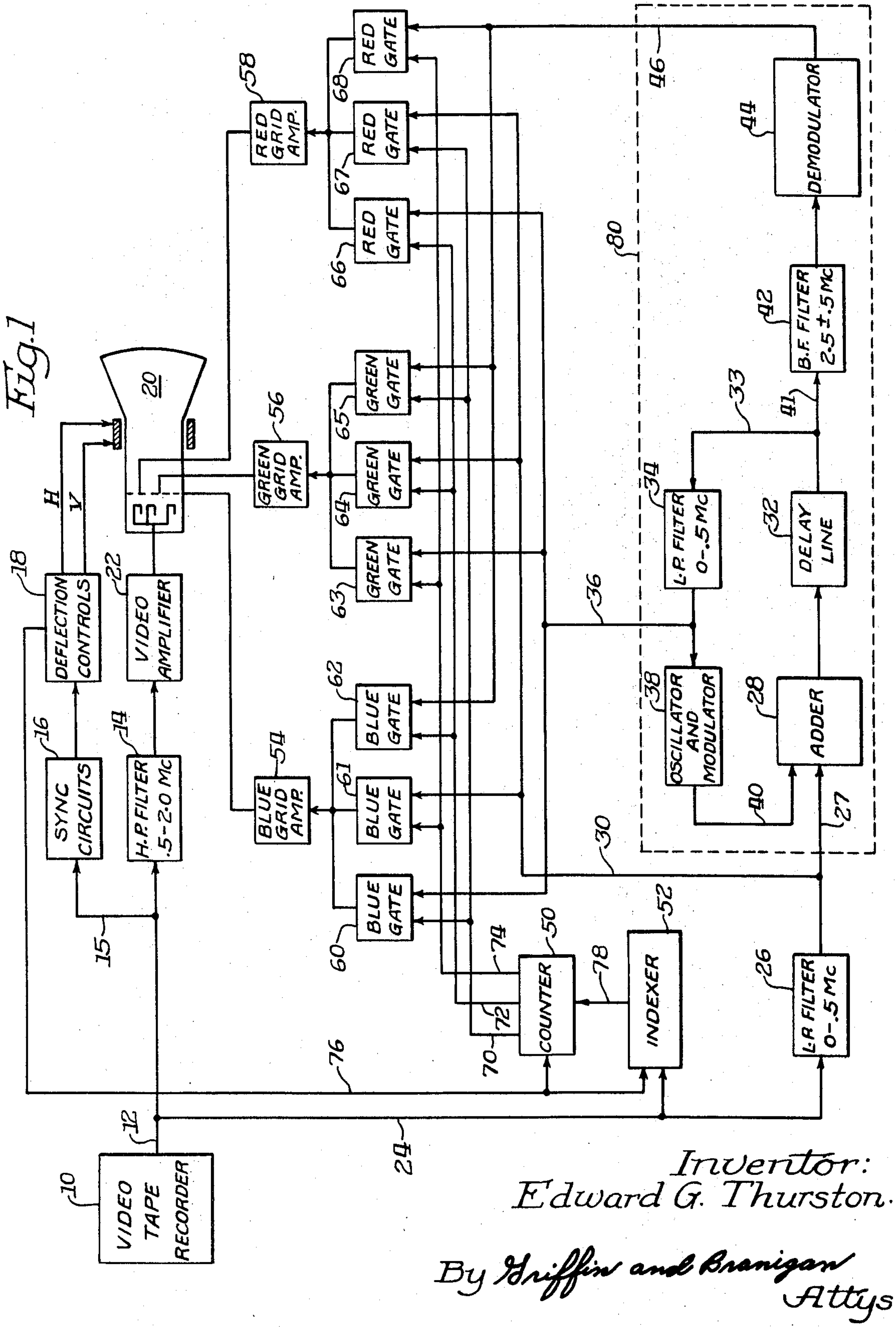
FIG. 1 is a block diagram of a preferred embodiment of the invention.

As shown in FIG. 1, the switching means comprises a counter 50, an indexer or discriminator 52, three amplifiers 54, 56 and 58, and a plurality of gating circuits 60 through 68.

Gates 60 through 62 are designated the blue gates and the output of each gate is connected to the blue grid amplifier 54. The output of the blue grid amplifier is connected to the grid of the blue gun of the display tube 20.

Gates 63 through 65 are designated the green gates and the output of each of these gates is connected to the green grid amplifier 56. The output of the green grid amplifier is connected to the grid of the green gun of the display tube.

Gates 66 through 68 are designated the red gates and the output of each of these gates is connected to the red grid amplifier 58. The ouput of the red grid amplifier is connected to the grid of the red gun of the display device.

The lead 30 is connected to one input of blue gate 61, green gate 64, and red gate 67. Lead 36 is connected to one input of blue gate 60, green gate 63, and red gate 66. Lead 46 is connected to one input of blue gate 62, green gate 65, and red gate 68.

Counter 50 controls gates 60 through 68 so that only one red gate, one blue gate, and one green gate is enabled during any given line scan interval. The counter is a modulo-three counter and may, for example, be a closed ring three-stage shift register like that disclosed in copending application Ser. No. 538,815. The counter has three stable states. The counter produces an output signal on a first lead 70 when in its first state; an output signal on a second lead 72 when in its second state; and an output signal on a lead 74 when in its third state. The lead 70 is connected to one input of gates 60, 65 and 67. The lead 72 is connected to one input of gates 62, 64 and 66, and the lead 74 is connected to one input of gates 61, 63 and 68.

The leads 70, 72 and 74 are energized in sequence as the count in the counter is advanced. When the counter reaches a full count it starts again from a zero count. The count in the counter is advanced by one for each horizontal line scan interval. Pulses derived from the horizontal pulse coil of the deflection controls 18 are applied to the counter by way of a lead 76 thus causing the counter to advance at the beginning of each line scan interval.

If the counter should miss a count then the color signals applied to the gates 60 through 68 would be directed to the wrong grids of the display tube. This would result in elements of the picture being displayed in the wrong colors if the condition were allowed to persist. The indexer 52 insures that the counter is reset to the proper count once each frame. Generally speaking, the indexer receives the signals on lead 24, strips out the vertical sync signal, and integrates the serrated pulses which occur during the vertical blanking interval. Since the serrated pulses occur at different times during the blanking intervals following the first and second fields of a frame, it is possible to match the output of the integrator with a horizontal pulse from lead 76 in an AND circuit and obtain an output signal once each frame. This signal appears on lead 78 and resets the counter to a predetermined state. The state to which the counter is set is chosen such that the horizonal sync pulse immediately preceding the first line of picture information of a frame advances the counter to its first state. The indexer or discriminator 52 is shown and its operation fully described in the aforementioned copending application.

TYPICAL OPERATION—FIG. 1

Assume that the vertical blanking interval between two frames has just been completed. During this interval the indexer resets the counter 50 to insure proper color registration.

Immediately preceding the first line of picture information the deflection controls produce a horizontal sync pulse on lead 76 to advance counter 50 to its first state.

The counter produces an output signal on lead 70 which conditions one input of each of the gates 60, 65 and 67.

Next, the first line of color information (assumed to be red) appears on lead 12 at the output of the video tape recorder and is applied to filters 14 and 26. Filter 14 passes the high frequencies (mixed highs), they are amplified by video amplifier 22, and applied to the cathodes of the display tube 20. At the same time, the filter 26 passes the low frequencies (red lows) which then pass over lead 30, through gate 67 and amplifier 58 to the red grid of the display tube. Thus, during the first line scan interval only the black and white detail and the red color information are available for display.

The red lows which pass through the filter 26 also pass over lead 27 and through adder 28, and enter the delay line 32. However, since the delay line delays signals applied thereto for one line scan interval, the red lows do not exit from the delay line until the second line scan interval.

At the beginning of the second line scan interval the deflection controls produce another pulse on lead 76 to advance the counter 50 to its second state. The control signal lead 70 terminates and a signal appears on lead 72 to condition one input of gates 62, 64 and 66. Immediately, thereafter, the second line of picture information (assumed to be green) is applied to lead 12. The high frequencies pass by way of filter 14 and amplifier 22 to the cathodes of the display tube. The green lows pass through filter 26, over lead 20, and through gate 64 and amplifier 56 to the green grid of the display tube. During this same interval, the red lows exit from delay line 32 and are applied to the red grid. The circuit is from delay line 32, lead 33, filter 34, lead 36, gate 66, and amplifier 58 to the red grid. Therefore, during the second line scan interval the black and white detail and the green lows of the current line are displayed along with the red lows of the preceding line.

During the second line scan interval the red and green lows are being stored in delay line 32 at the same time they are being displayed. The green lows pass directly from filter 26 to adder 28. The red lows appearing at the output of filter 34 are applied to the oscillator and modulator unit 38 and the resulting modulated signal applied to the adder. The sum of the modulated signal and the green lows appears at the output of the adder and is applied to the delay line where it is delayed until the third line scan interval.

At the beginning of the third line scan interval the deflection controls again produce a horizontal pulse on lead 76 to advance counter 50. The control signal on lead 72 is terminated and lead 74 is energized to condition one input of each of the gates 61, 63 and 68. Next, the third line of picture information (assumed to be blue) appears on lead 12 and the high frequencies are immediately applied to the cathodes of the display tube by way of filter 14 and amplifier 22. Concurrently therewith, the blue lows are applied to the blue grid. The circuit is from lead 12, filter 26, lead 30, gate 61, and amplifier 54 to the blue grid.

During the third line scan interval the sum signal representing the green lows and the modulated red lows emerges from delay line 32. The green lows pass over lead 33, through filter 34, over lead 36, and through gate 63 and amplifier 56 to the green grid. The red lows pass through filter 42 and are removed from their carrier signal by demodulator 44. After recovery from the carrier signal the red lows pass over lead 46 and through gate 68 and amplifier 58 to the red grid. Thus, during the third line scan interval the black and white detail (mixed highs) and the blue lows of the third line of picture information, the green lows of the second line, and the red lows of the first line are displayed, with the mixed highs being added separately to the red lows and the green lows within the display tube.

During the third line scan interval the green lows emerging from delay line 32 pass through filter 34 and are applied to the modulator unit 38. The resulting modulated carrier is applied to the adder where it is added to the blue lows appearing at the output of filter 26. The green lows (modulated) and the blue lows (unmodulated) then pass into delay line 32 where they are stored until the beginning of the fourth line scan interval.

At the beginning of the fourth line scan interval the deflection controls again produce a horizontal sync pulse on lead 76 to advance counter 50. This advance places the counter in the same state as it was for the first line scan interval so a control signal on lead 70 again conditions gates 60, 65 and 67. The operation of the circuit is the same as for the first line scan interval except that now the delay line 32 is storing the green and blue lows from the second and third line scan intervals. Thus, during the fourth line scan interval the mixed highs and lows of the red signal appearing on lead 12 during the fourth scan interval are displayed along with the green lows of the second interval and the blue lows of the third interval.

From the above description it should be obvious that the operation of the circuit for the fifth line scan is like that for the second, the operation for the sixth line scan is like that for the third, and so forth. This repetitive sequence is repeated throughout the first field of a frame and the second field of a frame is repeated in the same manner as described above. At the end of each frame or, more precisely, during the vertical blanking interval between the last field of one frame and the first field of the next frame, the indexer produces a reset pulse on lead 78 to insure that the counter 50 is synchronized for the start of the next frame.

It should be understood that the invention is not limited to use in a system employing the colors red, green, and blue, these colors being chosen by way of illustration only. Furthermore, the sequence of the signals need not be red, green, blue, but may, for example be green, red, blue provided appropriate changes are made in the connections between counter 50 and gates 60–68.

The novel method disclosed and claimed herein may be practiced with apparatus other than that shown in FIG. 1. For example, the grids of the display tube may be connected in common and the highs applied thereto without delay. In this case the cathodes are separately controlled with the outputs of gates 60–62, 63–65 and 66–68 being connected through video amplifiers to the blue, green and red cathodes respectively.

ALTERNATIVE EMBODIMENT—FIG. 3

The delay circuit 80′ may be substituted for the delay circuit 80 of FIG. 1. In delay circuit 80′, the incoming lows appear on lead 27 and are immediately applied to the gates 61, 64 and 67 (FIG. 1) by way of lead 30. The lows are also applied to delay line 32 where they are delayed for one line scan interval before being applied by way of lead 36 to the gates 60, 63 and 66. The output delay line 32 is connected to a further delay line 32′ which also has a delay equivalent to one line scan interval. The output of delay line 32′ is applied by way of lead 46 to the gates 62, 65 and 68.

As the lows of each color signal appear on line 28 they immediately appear on lead 30, appear on lead 36 after one line scan interval, and appear on lead 46 after two line scan intervals. Thus, the circuit 80′ responds to the same input signals and produces the same output signals as the circuit 80 of FIG. 1 and may be substituted therefor.

Figure 3:
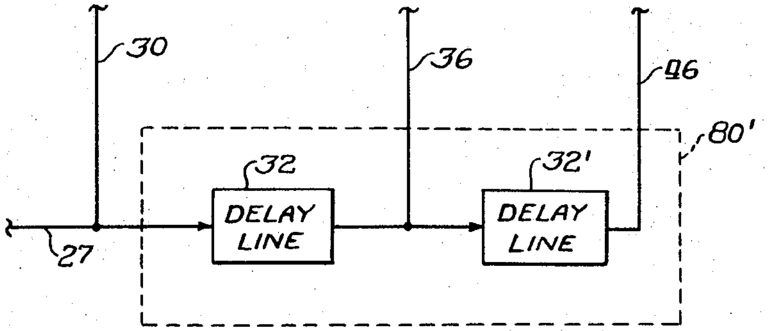
FIG. 3 illustrates a modification of the system shown in FIG. 1.

The circuit 80′ does not require the adder, modulator and demodulator of the circuit 80 because of the addition of the second delay line 32′. Thus, the modification shown in FIG. 3 is similar to the delay system suggested in the aforementioned application. However, because of the present novel method wherein the mixed highs are displayed currently with their reception, the bandwidth requirements for delay lines 32 and 32′ are less than for the delay lines of the copending application.

ALTERNATIVE EMBODIMENT—FIG. 4

Figure 4:
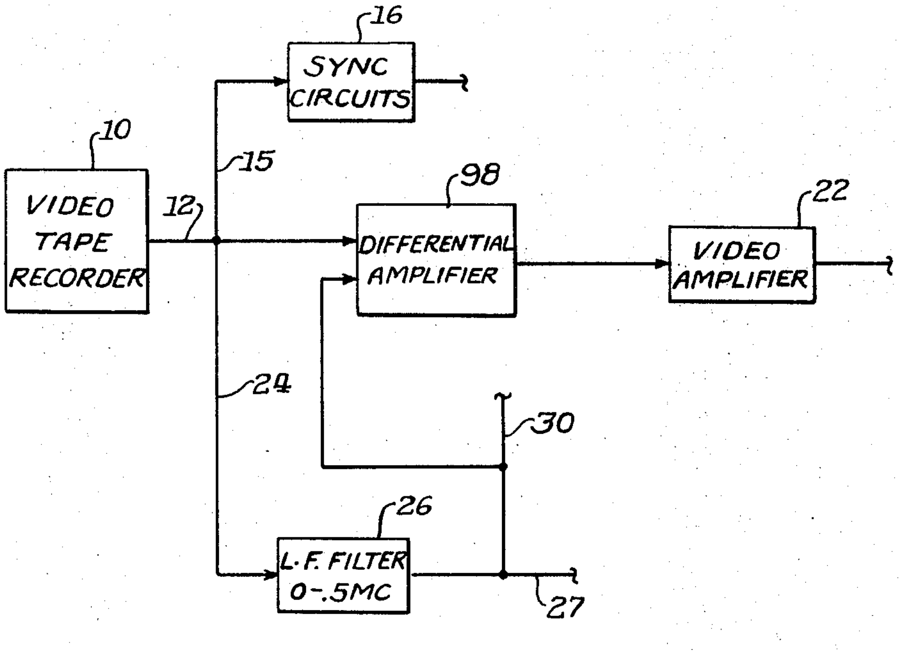
FIG. 4 illustrates a further modification of the system shown in FIG. 1.

FIG. 4 shows an alternative apparatus for separating the incoming signals into the highs and lows. In this embodiment the high pass filter 14 (FIG. 1) is replaced by a differential amplifier 98. The differential amplifier has one input connected to the incoming line 12 through a compensating delay (not shown), and the other input connected to the output of low pass filter 26.

An incoming signal appearing on lead 12 is applied to the differential amplifier and to filter 26. The filter passes only the low frequencies and they are applied to the differential amplifier which subtracts them from the incoming signal on lead 12. Thus, the output of differential amplifier 98 represents only the mixed highs of the incoming signal. The modification shown in FIG. 4 may be used in conjunction with the system of FIG. 1. The operation of the overall system will be essentially the same as previously described.

ALTERNATIVE EMBODIMENT—FIG. 5

FIG. 5 shows still another apparatus for practicing the novel method. The line sequential color signals are applied to the apparatus by way of input line 12. Each color signal on line 12 passes through a filter 26 which filters out the highs and passes only the lows by way of lead 27 to a delay circuit 80. The filter 26, delay circuit 80, counter 50 and gates 60–68 shown in FIG. 5 correspond to the similarly numbered elements of FIG. 1. Delay circuit 80 delays the lows for each color signal for a first and then a second line scan interval. The once-delayed lows appear on lead 36 and the twice-delayed lows appear on lead 46.

The leads 70, 72 and 74 which connect the outputs of counter 50 with the inputs of gates 60–68 are connected in exactly the same manner as for FIG. 1. Furthermore, the connections 36 and 46 between the delay unit 80 and the gates 60, 62, 63, 65, 66 and 68 are the same as for FIG. 1. However, in FIG. 5 the video information input to gates 61, 64 and 67 comes directly from input lead 12.

The output of the red gates 66–68 are connected to the input of a red video amplifier chain 82. The outputs of the green gates 63–65 are connected to the input of a green video amplifier chain 84, and the outputs of the blue gates 60–62 are connected to the input of a blue video amplifier chain 86. The outputs of the red, green, and blue amplifier chains are connected to the red, green, and blue cathodes, respectively, of the display tube 20. The grids of the display tube are connected to a bias voltage source 88 so that the grids of all guns in the tube are always conditioned for display.

The circuit includes a first bilateral conducting circuit 90 connected between the green and blue amplifier chains, a second bilateral conducting circuit 92 connected between the green and red amplifier chains, and a third bilateral conducting circuit 94 connected between the red and blue amplifier chains. Each bilateral conducting circuit includes high pass filter means for passing signals in the range from .5 to about 2 mc., the upper limit being determined by the upper limit of the signals which might be received on input lead 12.

The purpose of the bilateral filters is to allow the highs portion (.5–2.0 mc.) of a color signal applied to one amplifier chain to be fed into the other amplifier chains while at the same time filtering out the lows (0–.5 mc.) which are applied to said one amplifier. The purpose of this operation will become clear upon consideration of the following example of operation.

Assume that several lines of color information have already been received on line 12 and that a new line of red color information is about to begin. As explained with reference to FIG. 1, the delay circuit 80 is storing the lows of the two preceding lines with the lows of the preceding blue signal about to appear on lead 36 and the lows of the preceding green signal about to appear on lead 46. The counter 50 is in its first state thereby applying a signal over lead 70 to gates 67, 60 and 65.

Since the gate 67 is enabled by the counter, the incoming red signal on lead 12 passes through gate 67, and amplifier 82 to the red cathode of the display tube 20. Thus, the full red color signal, including the highs and the lows, is applied to the red cathode during the interval it is received.

As the red color signal passes through the red amplifier chain it is tapped off and applied to the bilateral filter circuits 92 and 94. Filter circuit 92 filters out the lows and applies the highs only to the green amplifier chain whereas filter circuit 94 filters out the lows and applies the highs only to blue amplier.

During the interval the red signal is being received on line 12, the lows for the preceding blue an green signals are appearing at the outputs of the delay circuit 80. The blue lows pass over lead 36, through gate 60 and into the blue amplifier chain where they are added to the mixed highs applied thereto from filter 94. The combined signal representing the highs for the current red signal and the lows for the preceding blue signal is applied to the blue cathode of the display tube.

The green lows pass over lead 46 and through gate 65, to the green amplifier where they are added to the red highs applied to the amplifier from filter 92. The combined signal is applied to the green cathode of the display tube.

Concurrently with the above-described operations the incoming red signal on lead 12 passes over lead 24 to filter 26. The filter output represents the red lows only and is applied to the delay circuit where it is stored.

At the beginning of the next line scan interval a horizontal sync pulse on lead 76 advances counter 50. It will be understood that the sync pulse may be derived from the deflection circuits as shown in FIG. 1.

After the counter is advanced the next line of color information (green) appears on lead 12. The highs and the lows of the green signal pass through gate 64 and amplifier 84 to the green cathode. The highs only of the green signal pass through filters 90 and 92 to the blue and red amplifiers 86 and 82, respectively. During this interval the red and blue lows stored in the delay circuit pass over leads 36 and 46, respectively, and through gates 66 and 72, respectively, to the red and blue ampliers. The green highs and red lows are combined and applied to the red cathode while the green highs and blue lows are combined and applied to the blue cathode.

The operation of the circuit during the receipt of a blue color signal on lead 12 should be evident. The highs and lows of the blue signal are applied to the blue cathode. The blue highs and red lows are applied to the red cathode and the blue highs and green lows are applied to the green cathode. The green and red lows are derived from the delay circuit by way of lead 36 and 46, respectively.

For the sake of clarity and ease of explanation certain "compensating delays" have been omitted from the drawing. Those skilled in the art will readily recognize that the electrical signal transit time between lead 12 and lead 30 (FIG. 1) will not be the same as that between point 12 and lead 46, even if the delay line 32 were not included in the circuit. The same is true for other signal paths between lead 12 and the control electrodes of the display tube. The exact difference in transit time is a function of the particular components used in the filters, demodulator, amplifiers, etc. Thus, to avoid confusion and simplify the explanation, this description assumes that none of the various circuit elements, other than delay line 32, cause an electrical signal to be delayed.

From the foregoing description it is evident that the present invention provides a novel method and apparatus for displaying line sequential color signals, said method permitting the display of more than one color during each line scan interval and requiring fewer expensive components than the systems heretofore known. It should be understood that the present concept of mixed highs display may be used in two color per line systems such as those described in the aforementioned copending application. When so used, the bandwidth requirements of the delay lines are reduced even though the character of the display remains the same insofar as line structure is concerned. While preferred embodiments have been shown and described with particularity, it will be evident that various modifications may be made which fall within the spirit and scope of the invention as defined by the appended claims.

The embodiments of the invention in which an exclusive property or privilege is claimed are defined as follows:

1. Color video display apparatus comprising:
- a color video display means having means for displaying three colors during each of a plurality of line scan intervals;
- input means for receiving a line sequential color signal representing one of said three colors during each line scan interval of said display means, each of said line sequential color signals comprising high frequency and low frequency components;
- first means connected between said input means and said display means for applying only the high frequency components to said display means;
- second means responsive to said input means for passing only the low frequency components of each color signal;
- delay circuit means responsive to said second means for delaying each of said low frequency components for a first and a second line scan interval and producing the delayed signals at first and second outputs; and,
- switching means responsive to said second means and said first and second outputs for applying only said low frequency components, said low frequency components delayed one line scan interval, and said low frequency components delayed two line scan intervals, to said display means;
- said display means comprising a cathode ray display tube having three electron guns, said electron guns comprising first and second sets of electrodes;
- said first means comprising a first filter means connected to apply said high frequency components in common to each electrode in said first set;
- said second means comprising a second filter means;
- said switching means including a sequencing means controlling a gating means for selectively gating the signals from said second filter means and said first and second outputs to individual ones of the electrodes in said second set so that each individual electrode in said second set receives only the low frequency components of one of said colors; and
- said delay circuit means comprising:
  - an adder, a delay line, a third filter means, and a modulator connected in a closed loop, and a band pass filter and demodulator;
  - the output of said second filter means being connected to said adder;
  - said band pass filter and demodulator being connected in series between said delay line and said second output; and,
  - the output of said third filter means corresponding to the first output of said delay circuit means.

2. Color video display apparatus as claimed in claim 1 wherein:
- said third filter means is a low pass filter for passing said low frequency components;
- said modulator includes means for modulating a carrier signal with said low frequency components as they appear at the output of said third filter means; and, said band pass filter includes means for passing only the carrier signal modulated with said low frequency components.

3. Video display apparatus for displaying line sequential color video signals, said signals representing three colors with each color signal being preceded by a synchronizing signal and each comprising:

means for receiving said line sequential color signals and synchronizing signal;

display device having first and second sets of control electrodes;

scan control means for controlling said display device to operate in a sequence of line scan intervals, said scan control means being connected to said receiving means and responsive to said synchronizing signals whereby one line scan interval of said display device corresponds to the interval during which one of said color signals is received;

first means connected between said receiving means and said first set of control electrodes for applying the high frequency components of each color signal to all electrodes of said first set during the line scan interval it is received;

second means responsive to said receiving means for filtering each color signal and passing only the low frequency components thereof;

delay means responsive to said second means for delaying each of said low frequency components for a first and then a second line scan interval;

sequencing means responsive to said synchronizing signals;

gating means responsive to said sequencing means, said second means, and said delay means for selectively applying each of said low frequency components for each color to a particular one of said electrodes of said second set during the line scan interval it is received by said receiving means, and during the next two succeeding line scan intervals; and said delay means comprising:

an adder;

a delay line for delaying electrical signals applied thereto for a time equal to one line scan interval, said delay line being responsive to said adder;

a filter connected to said delay line for passing only said low frequency components;

means responsive to said filter for producing a carrier signal modulated by said low frequency components;

a band pass filter responsive to said delay line output for passing only said carrier signal and its modulation; and a demodulator responsive to the output of said band pass filter for demodulating said carrier and recovering said low frequency components.

4. Video display apparatus as claimed in claim 3 wherein said gating means comprises:

three groups of gates, each of said groups comprising three gates;

means connecting one gate in each group to the output of said second means;

means connecting a second gate in each group to the output of said filter;

means connecting a third gate in each group to the output of said demodulator;

means connecting the outputs of all gates in each one of said groups to one electrode of said second set of electrodes; and, means connecting said sequencing means to all said gates, said sequencing means selectively producing output signals to enable only one gate in each of said groups during each line scan interval and enable the gates within each group in a repetitive sequence so that each gate is enabled once every third line scan interval.

5. Apparatus for delaying in input signal for a first period of time *t*, or a second period of time 2*t* said apparatus comprising:

an adder means;

a delay line responsive to said adder and have a delay time *t*;

first filter means responsive to said delay line;

means for generating a carrier signal and modulating said carrier signal with the output of said first filter means;

means for appling said input signal and said modulated carrier signal to said adder;

second filter means connected to the output of said delay line for passing only said modulated carrier signal;

demodulator means responsive to said second filter means;

and output circuit means responsive to said first means and said demodulator means, said input signal appearing at said output circuit means a first period of time *t* and a second period of time 2*t* after it is applied to said adder.

References Cited

UNITED STATES PATENTS

| | | | |
|---|---|---|---|
| 2,634,324 | 4/1953 | Bedford | 178—5.2 |
| 2,635,140 | 4/1953 | Dome | 178—5.2 |
| 2,674,692 | 4/1954 | Cutler | 325—9 |
| 2,920,289 | 1/1960 | Meyer | 328—15 |

ROBERT L. GRIFFIN, Primary Examiner

J. C. MARTIN, Assistant Examiner

U.S. Cl. X.R.

328—15